Feb. 8, 1927.

P. MAYER ET AL 1,616,697

DISK ATTACHMENT FOR GANG PLOWS

Filed March 15, 1926

INVENTORS
*Paul Mayer*
*Fred Veit*

BY

ATTORNEY

Patented Feb. 8, 1927.

1,616,697

UNITED STATES PATENT OFFICE.

PAUL MAYER AND FRED VEIT, OF LODI, CALIFORNIA.

DISK ATTACHMENT FOR GANG PLOWS.

Application filed March 15, 1926. Serial No. 94,744.

This invention relates to agricultural implements and particularly to plowing or cultivating devices for use in orchard or vineyard work.

It is customary to plow at certain seasons between the rows of trees or vines in order to maintain the dirt in a loosened condition, and gang plows drawn by tractors are usually now used for this purpose.

With such plows it is practically impossible to get as close to the trunks of the trees or vines as should be the case to obtain the best results from the plowing operations, and the ground close to said trunks is either left untouched or a hand plow is used to follow up the gang plow. This operation of course entails considerable expense and consumes valuable time.

The principal object of our invention therefore is to provide an auxiliary plowing device, to be removably attached to a standard gang plow, so disposed and constructed as to work as close to the trunks as need be, while at the same time being capable of giving laterally and transversely if an obstruction in the path of the auxiliary plow is encountered. This yielding of the auxiliary plow takes place automatically and not only prevents damage being done to the attachment but prevents the attachment from possibly damaging any roots and trunks should the attachment be running too close to the trees.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
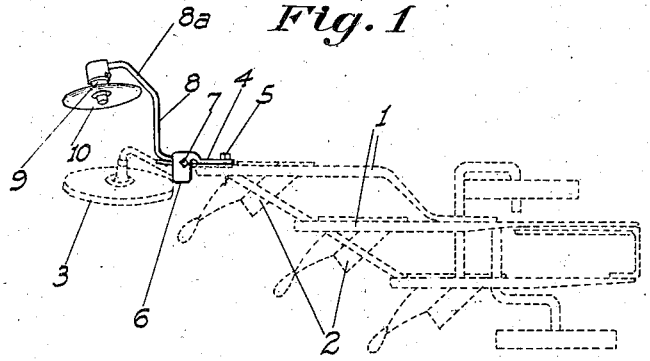
Fig. 1 is a plan outline of a standard gang plow showing our auxiliary plowing attachment applied thereto.
Figure 2:
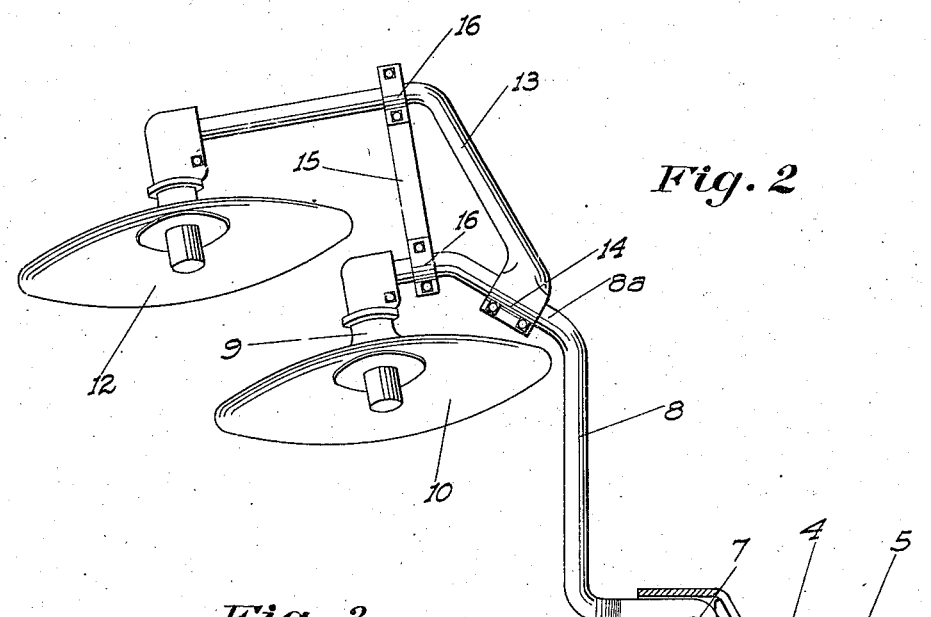
Fig. 2 is a plan view of the device detached showing the same in a two-disk form.
Figure 3:
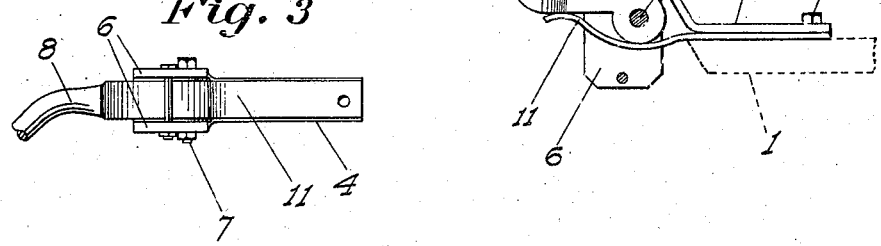
Fig. 3 is a side elevation of the supporting bracket of the attachment.

Referring now more particularly to the characters of reference on the drawings, the usual longitudinal gang plow includes the usual longitudinal gang plow includes the usual longitudinal beams 1 curving downwardly at their lower ends to support the longitudinally and transversely offset plow devices 2, and a coulter wheel 3 projecting rearwardly from the rear plow member 2.

Our attachment, which is readily applied to such standard plows, comprises a bracket consisting of a longitudinal plate 4 to be abutted against the outside of the outermost beam 2 near the rear curved end thereof, and to extend rearwardly therefrom. This plate is attached to the beam by a single bolt 5 which allows the plate vertical swivel movement. Formed with the plate at its rear end are vertically spaced flanges 6 which support a vertical spindle or bolt 7.

Pivoted on the spindle and projecting rearwardly from between the flanges is an arm 8. This arm to the rear of the flanges is bent transversely and away from the beam 1 for a certain distance, and is then again bent as at 8$^a$ to extend rearwardly at an obtuse angle with the transversely extending portion of the arm. At the outer and rear end of the angular portion 8$^a$ is fixed a bearing member 9 on which is turnably mounted a plowing disk 10 of common character. This disk is positioned inwardly of the arm portion 8$^a$ and between said portion and the plane of the beam 1, and is of course disposed rearwardly of the arm 8. As is customary the disk is set at a certain vertical angle both longitudinally and transversely of the line of travel of the plow. The length of the arm 8 from front to rear is preferably such that the disk 10 is disposed adjacent the transverse plane of the wheel 3. A spring 11 mounted in connection with the supporting bracket bears against the adjacent portion of the arm 8 and acts on the same to normally hold the disk in its outermost position.

In operation it will be seen that the disk will work the ground a considerable distance to the left of the sphere of action of the main plows 2, so that said main plows may travel centrally between the rows of trees or vines, while the disk 10 acts on the ground adjacent the trees. Being free to swing vertically, the disk can lift when passing over heavy obstructions, such as roots, on or under the ground, thereby preventing damage to either the roots or the attachment. Being also able to swing inwardly and laterally the disk itself will never contact with the trunks of vines or trees ahead, since the angular arm portion 8$^a$ ahead of the disk acts as a guard and deflector which will strike the trunk and cause the arm attachment and the disk mounted thereon to swing inwardly on its pivot 7 so that the attachment clears the trunk. The spring 11 then acts to again move the attachment outwardly, an operation which is aided by the inclination of the disk which naturally tends to cause the same to move outwardly.

Ordinarily a single disk is sufficient for the auxiliary plowing purposes, but if desired an additional disk 12, parallel to the disk 10, may be located in a suitable position both rearwardly and outwardly of said disk 10. This additional disk is mounted on an arm member 13 which is bent forwardly and inwardly ahead of the disk 12 to approach the arm portion 8ª. The member 13 is removably attached to said portion 8ª by a suitable clamping yoke 14 provided with the arm 13. In order to prevent too great a strain being placed on the clamp 14, and insuring the disks 10 and 12 being maintained parallel to each other, a brace 15 is provided to extend between the arm members 13 and 8ª, the brace having suitable arm engaging clamps 16 at both ends. From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. An attachment for plows having a main beam comprising a bracket adapted to be mounted onto the beam, an arm pivoted onto the bracket on a vertical axis and extending rearwardly therefrom, a disk mounted on the rear end of the arm, and spring means mounted in direct connection with the bracket and engaging the arm to swing the same outwardly relative to the beam; the bracket being arranged to engage the arm and limit the outward movement thereof.

2. An attachment for plows having a main beam comprising a bracket adapted to be mounted onto the beam, an arm pivoted onto the bracket on a vertical axis and extending rearwardly therefrom, a disk mounted on the rear end of the arm, another arm, means on the forward end of said other arm for detachable clamping engagement with the first named arm intermediate its ends, a disk on the rear end of said other arm parallel to the first named disk, and a transverse brace member detachably connected to the second named arm intermediate its ends and to the first named arm adjacent its rear end.

In testimony whereof we affix our signatures.

PAUL MAYER.
FRED VEIT.